(12) United States Patent
Atif et al.

(10) Patent No.: US 10,007,937 B1
(45) Date of Patent: Jun. 26, 2018

(54) MARKETPLACE SELLER REFERRALS

(71) Applicant: Amazon Technologies, Inc., Reno, NV (US)

(72) Inventors: Mohammed Ameenuddin Atif, Hyderabad (IN); Anup Patnaik, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 888 days.

(21) Appl. No.: 13/924,077

(22) Filed: Jun. 21, 2013

(51) Int. Cl.
    G06Q 30/00 (2012.01)
    G06Q 30/06 (2012.01)

(52) U.S. Cl.
    CPC ................ *G06Q 30/0601* (2013.01)

(58) Field of Classification Search
    CPC ................................ G06Q 30/0601
    USPC .................................. 705/26.61
    See application file for complete search history.

(56) References Cited

U.S. PATENT DOCUMENTS

| | | | | |
|---|---|---|---|---|
| 6,405,175 B1* | 6/2002 | Ng | ............ | G06Q 30/02 705/14.26 |
| 8,768,784 B1* | 7/2014 | Varadarajan | ....... | G06Q 30/0601 705/26.1 |
| 2002/0082960 A1* | 6/2002 | Goedken | ............... | G06Q 30/02 705/35 |
| 2002/0169626 A1* | 11/2002 | Walker | ................... | G06Q 30/02 705/1.1 |
| 2003/0204467 A1* | 10/2003 | Kartha | ................... | G06Q 30/08 705/37 |
| 2007/0043583 A1* | 2/2007 | Davulcu | ........... | G06F 17/30864 705/1.1 |
| 2007/0265921 A1* | 11/2007 | Rempe | ................... | G06Q 30/02 705/14.16 |
| 2008/0294552 A1* | 11/2008 | Kaufman | ............. | G06Q 20/102 705/40 |
| 2013/0144754 A1* | 6/2013 | Moser | ................... | G06Q 30/06 705/26.35 |
| 2013/0218608 A1* | 8/2013 | Huson | ............... | G06Q 30/0603 705/5 |
| 2014/0114737 A1* | 4/2014 | Espejo | ................... | G06Q 30/02 705/14.27 |

(Continued)

OTHER PUBLICATIONS

Silverstein, Barry. "Developing Internet Partnerships." Direct Marketing, vol. 63, No. 11, 2001, pp. 33-44.*

*Primary Examiner* — Alexis Casey
(74) *Attorney, Agent, or Firm* — Lee & Hayes, PLLC

(57) ABSTRACT

A service provider may collect information about items offered by merchants and prices for the items. The service provider may use the collected information to determine whether to recruit the merchant to join an electronic marketplace to offer one or more items for consumption. The service provider may receive the information from customer submissions, from monitoring payment processing data accessible to the service provider, or both. The service provider may collect various pieces of information about the seller and/or items offered by the seller. The collected information may include contact information of the seller, location information of the seller, a price of the item, an inventory or availability of the item, special options, and so forth, which may differentiate the seller and/or the item from other available sellers and items accessible through the electronic marketplace.

21 Claims, 7 Drawing Sheets

(56) References Cited

U.S. PATENT DOCUMENTS

2015/0242881 A1\* 8/2015 Osborne ............ G06Q 30/0236
705/14.36

\* cited by examiner

MARKETPLACE SELLER REFERRALS

BACKGROUND

Many electronic marketplaces provide services or platforms that allow other sellers to sell products and services to customers of the electronic marketplaces. Examples of electronic marketplaces include auction marketplaces, listing or classified marketplaces, and full service transaction marketplaces that include payment processing and/or shipping of items on behalf of the sellers. When a customer visits one of these electronic marketplaces, the customer may browse for products and/or services from any number of different sellers, each different seller competing with other sellers that offer products and services using the same marketplace or a different marketplace.

A provider of the electronic marketplace often generates revenue by receiving a portion of proceeds collected from sales by sellers using the electronic marketplace. Therefore, the provider is incentivized to maximize sales, which often requires the electronic marketplace to offer desirable products/services at a competitive price. To achieve these ends, the provider must find and attract sellers, which can offer desirable products/services at a competitive price, to the electronic marketplace.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to identifying and recruiting new sellers to an electronic marketplace. A service provider may incentive users (also referred to as "customers") to provide information about sellers (also referred to as "merchants") and respective products and services offered by these sellers when the users shop or otherwise interact with the sellers. For example, a user may visit a physical store or website of a seller and discover that the seller offers an item at a price that is relatively low compared to an average price charged by other sellers. The user may then inform the service provider of the seller, the product, the price of the product, and/or other information, which may be used by the service provider to possibly recruit the seller to join an electronic marketplace to offer the product for an amount equal to or near the stated price. In another example, the service provider may receive information about sales by a seller from an operation performed by the service provider, such as by assisting in processing a payment for the seller, a customer that interacts with the seller, or both. For example, the service provider may perform payment processing, manage an electronic wallet, or provide other financial processing functions for the seller, the user, or both. The service provider may analyze the information and determine, in response to the analysis, whether the seller is a good candidate to recruit to join the electronic marketplace.

In some embodiments, the service provider may collect various pieces of information about the seller and/or product or service (collectively referred to herein as "item") offered by the seller. For example the service provider may collect contact information of the seller, location information of the seller, and an indication of the seller's interest in selling on the electronic marketplace. The service provider may also collect information about the item. For example, the service provider may determine a price of the item, an inventory or availability of the item, special options (e.g., same day deliver, installation, etc.), if the item is a special addition, if the item includes bonus offerings, and so forth, which may differentiate the seller and/or the item from other available items and make an offer of the item by the seller a competitive and desirable offer to customers of the electronic marketplace.

In return for transmitting information to the service provider, a user may become eligible for a reward. For example the service provider may provide a reward to the user in response to successful recruitment of the seller and/or in response to actions of the seller in association with the electronic marketplace.

The techniques and systems described herein may be implemented in a number of ways. Example implementations are provided below with reference to the following figures.

Illustrative Environment

Figure 1:
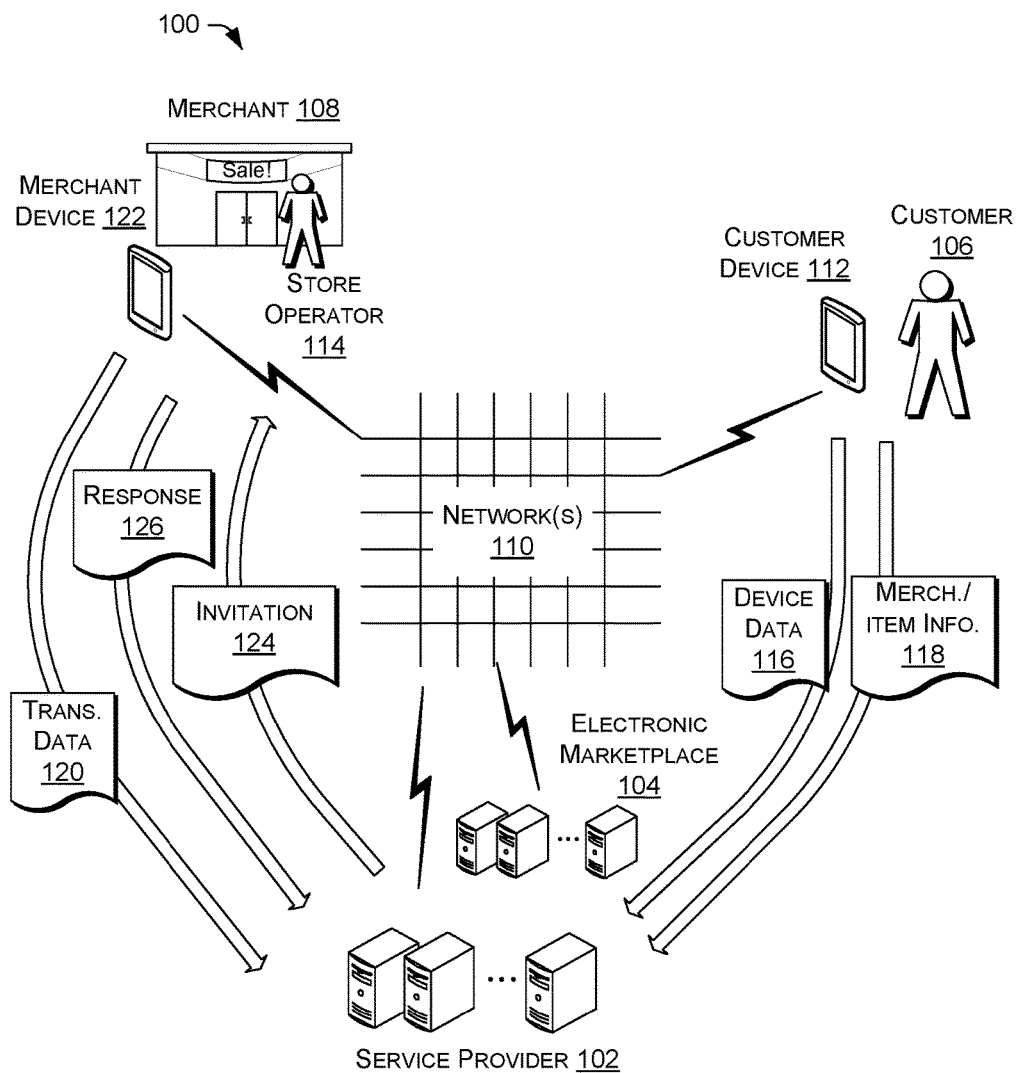
FIG. 1 is a schematic diagram of an illustrative environment to facilitate operation of a referral service to identify sellers of particular products and/or services for an electronic marketplace.

FIG. 1 is a schematic diagram of an illustrative environment 100 to facilitate operation of a referral service to identify sellers (merchants) of particular items for an electronic marketplace. The environment 100 may include a service provider 102 that recruits sellers to sell the particular products and/or services for an electronic marketplace 104. In some instances, the service provider 102 manages or otherwise runs the electronic marketplace 104. However, the service provider 102 may provide recruitment of sellers as a service for an electronic marketplace 104 and may not operate its own electronic marketplace. The electronic marketplace 104 may be any electronic site or collection of sites, application(s), repository, web address collection, or other electronic offering of products, services, or both. The electric marketplace 104 may allow many different sellers to offer products and/or services for consumption by customers, including a customer 106. The electronic marketplace 104 may be accessible by electronic devices via one or more networks.

The customer 106 may interact with a merchant 108, which may become or may already be a seller that offers one or more products and/or services for consumption via the electronic marketplace 104. The merchant 108 may operate a physical store (e.g., a brick and mortar store, a mobile store, etc.), a virtual store, or both. A virtual store may be a store that offers products online, by telephone, or in other ways possibly without dependence on a physical store to showcase products, services, and other offerings. While interacting with the merchant 108, the customer 106 may identify a product or service, referred to herein collectively as an "item," that may be desirable to other customers if the item was made available for consumption on the electronic marketplace 104. For example, the item may be offered for a price that is relatively lower than a price of the item offered by other sellers, the item may be unique, the item may include special services such as special delivery or installation, and/or the item may otherwise be desirable for consumption by other customers. The customer 106 may then provide information about the merchant 108 and/or the item to the service provider 102 via one or more network(s) 110 using a customer device 112. The customer device 112 may be a mobile telephone (e.g., a smart phone, a digital assistant, etc.), a portable computer, a tablet computer, or any other electronic device capable of transmitting information using the network(s) 110. As an example, the customer 106 may seek permission from a store operator 114 or other human to transmit information about the merchant 108 and/or the item to the service provider 102. In some instances, the customer 106 may transmit information that is readily available to the public, and thus no permission may be warranted or needed prior to transmission of the information. This may be particularly true when the merchant offers the item through a virtual store (e.g., online, by telephone, etc.).

In some embodiments, the customer device 112 may transmit device data 116 as at least part of the information that is transmitted to the service provider 102. The device data 116 may include data generated by the customer device 112, such as location information associated with the merchant 108 (e.g., global positioning system (GPS) information, etc.), electronic wallet information associated with a transaction with the merchant 108, and/or other types of information generated by the customer device 112 and associated with the merchant 108. In various embodiments, the customer device 112 may transmit merchant/item information 118 to the service provider 102. The merchant/item information 118 may include information submitted by the customer 106 about the merchant 108, the items, or both. For example, the merchant/item information 118 may include a location and identity of the merchant 108, contact information of the merchant (e.g., email address, telephone number, etc.), an identifier of the item, a price of the item, any known duration of the price (e.g., weekly special, everyday low price, etc.), a quantity of the item, and/or other information. The customer 106 may seek permission from a store operator 114 to transmit the merchant/item information 118 to the service provider 102. In some instances, the customer 106 may transmit the merchant/item information 118 that is readily available to the public, and thus no permission may be warranted or needed prior to transmission of the merchant/item information 118.

In accordance with some embodiments, the service provider 102 may process payments for the merchant 108 or otherwise have accesses to transaction data 120 from a merchant device 122 of the merchant 108. The merchant device 122 may be a mobile telephone (e.g., a smart phone or digital assistant, etc.), a portable computer, a tablet computer, or any other electronic device capable of transmitting information using the network(s) 110. As an example, the service provider 102 may operate a point-of-sale (POS) application, act as a payment processor that processes payments for the merchant 108, or otherwise obtain transaction data from the merchant 108 with authorization from the merchant 108.

The service provider 102 may process any information collected about the merchant 108 (e.g., the device data 116, the merchant/item information 118, etc.) and/or from the merchant 108 (e.g., the transaction data 120, etc.) to determine whether the merchant 108 is a candidate to become a seller of one or more items offered on the electronic marketplace 104. If the service provider 102 determines that the merchant 108 is a candidate to become a seller of one or more items offered on the electronic marketplace 104 based on the analysis, then the service provider 104 may provide an invitation 124 to the merchant 108, such as to the store operator 114 or other authorized or designated person. The invitation may be transmitted via the network(s) 110 to the merchant device 122. In some embodiments, the invitation may be generated using an automated process and transmitted by servers of the service provider or remote servers under at least partial control of the service provider 102 (e.g., via a distributed computing environment, a cloud computer service, etc.). The store operator 114 or other authorized or designated person may provide a response 126, which may be received by the service provider 102 via the servers or remote servers. In response to receiving the response 126 that accepts the invitation 124, the service provider 102 may initiate or configure the merchant 108 to join the electronic marketplace 104 and offer one or more items for consumption by customers of the electronic marketplace 104.

In some embodiments, the service provider 102 may provide a reward to the customer 106 in response to recruiting the merchant 108 to join the electronic marketplace 104. The reward may be contingent on activity by the merchant 108 as a seller on the electronic marketplace 104. For example the customer 106 may receive a reward, such as a gift card, a rebate, a payment, or another reward after the merchant 108 becomes active as a seller on the electronic marketplace 104. In some embodiments, the service provider may employ fraud detection to prevent misuse of the referral system.

The environment 100 provides a general framework of possible communications between the service provider 102, the merchant 108, the customer 106, and the electronic marketplace, but is not exhaustive. Some of the computing devices included in the environment 100 are described in greater detail below.

Figure 2A:
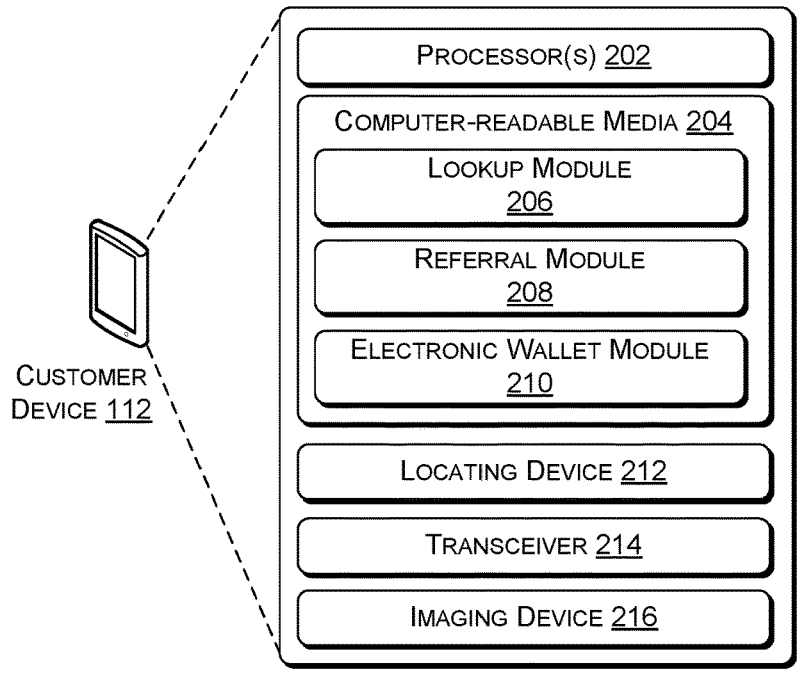
FIGS. 2A and 2B are block diagrams of illustrative computing architecture of various devices included in the environment of FIG. 1.
Figure 2B:
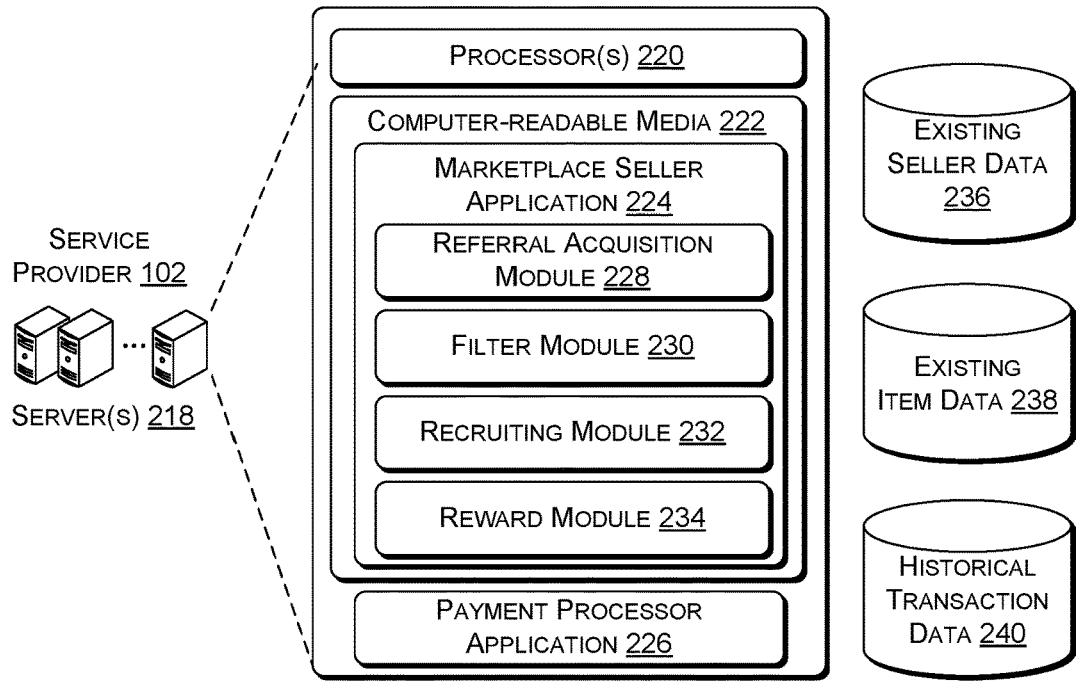

FIGS. 2A and 2B are block diagrams of illustrative computing architecture of various devices included in the environment of FIG. 1. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download.

FIG. 2A shows an illustrative computing architecture of the customer device 112. The architecture may include processor(s) 202 and computer-readable media 204. The computer-readable media 204 may store various modules, applications, programs, or other data. The computer-readable media 204 may include instructions that, when executed by the processor(s) 202, cause the processor(s) to perform the operations described herein for the customer device 112. The computer-readable media 204 may store a lookup module 206, a referral module 208, an electronic wallet module 210, or any combination thereof. Each module is described in turn.

The lookup module 206 may allow the customer 106 to lookup information about an item. The lookup module 206 may obtain information about the item from a user, capture imagery, obtain wireless information (e.g., receiving a radio frequency identifier (RFID), etc.), and/or perform other lookup operations. The lookup module 206 may transmit the information about the item to a source, such as the service provider 102 and/or the electronic marketplace 104 to retrieve information about the item, such as a price, any known duration of the price, availability, and/or other information. The lookup module 206 may provide information to the customer 106 to allow the customer to determine whether a price offered by the merchant 108 for the item is a competitive price in view of sellers that offer a same or similar item via the electronic marketplace 104. In various embodiments, the lookup module 206 may provide a link or other mechanism for the customer 106 to purchase the item from a different merchant. For example, the lookup module 206 may allow the customer 106 to obtain the item using the electronic marketplace 104.

Figure 6:
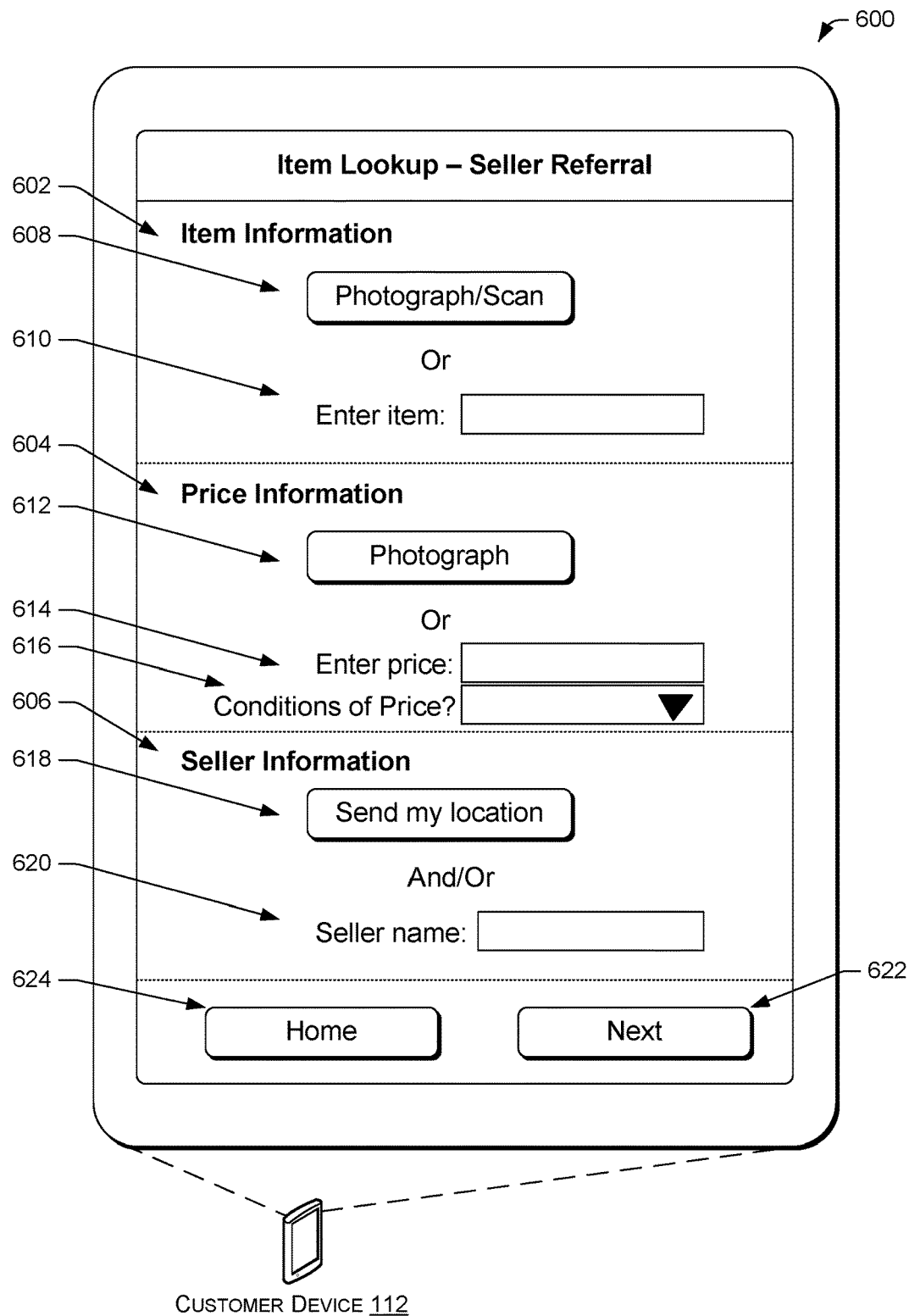
FIG. 6 is an illustrative user interface (UI) that facilitates obtaining information about a customer experience at a seller that may lead to a referral of the seller to an electronic marketplace.
Figure 7:
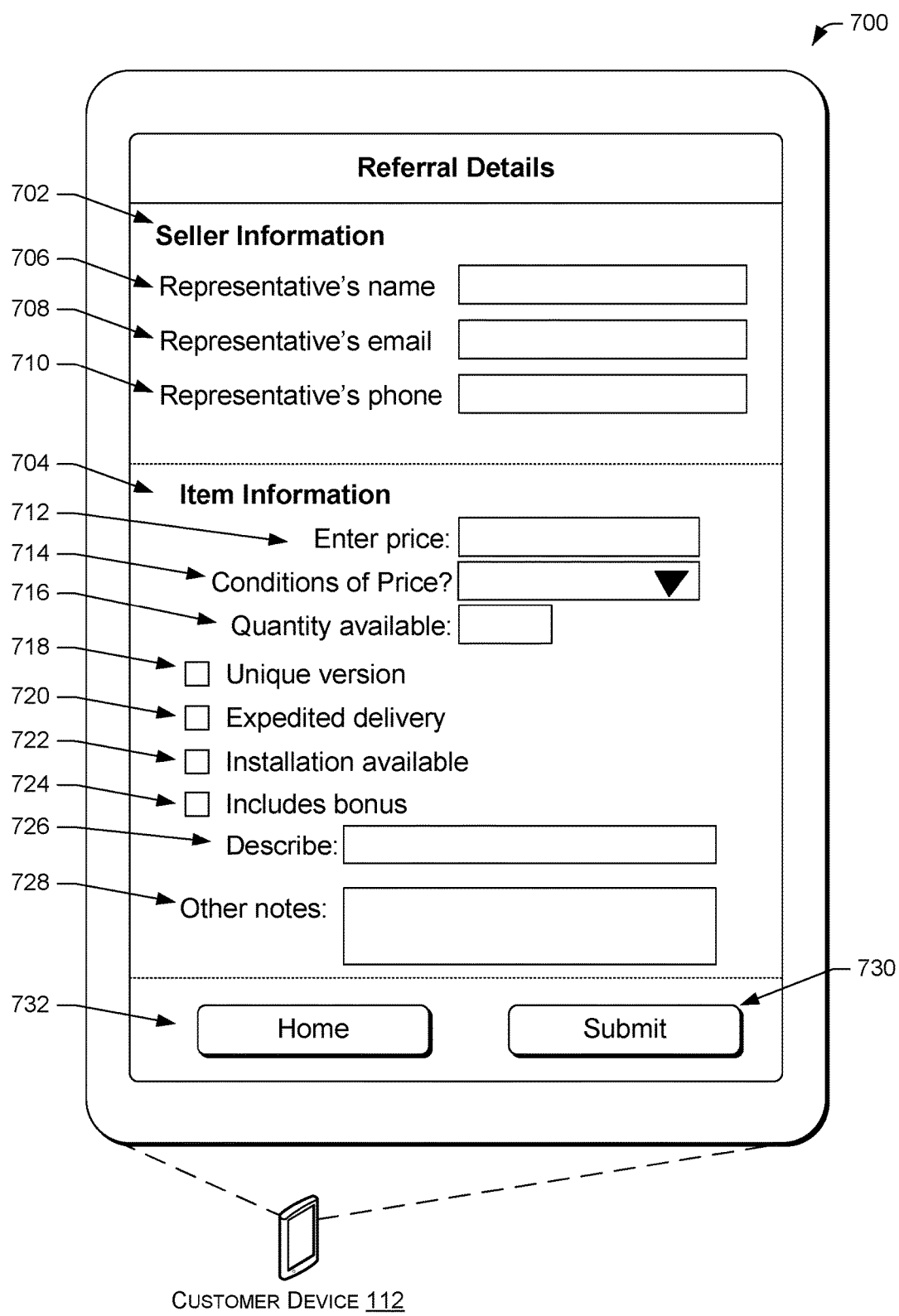
FIG. 7 is an illustrative UI that facilitates collecting information about the seller and/or item information that may lead to a referral of the seller to an electronic marketplace.

The referral module 208 may collect and transmit the device data 116 and/or the merchant/item information 118. As discussed above, the device data 116 may be data that is associated with the merchant 108 and/or the item and collected by the customer device 112, such as location information, imagery, wireless data, and/or other types of information that is associated with the merchant 108 and/or the item. The merchant/item information 118 may include information submitted by the customer 106 about the merchant 108, the items, or both. The merchant/item information 118 may be input by the customer 106 into the referral module, such as by population of data fields. FIGS. 6 and 7 show illustrative user interfaces that may collect at least some possible information for the lookup module 206 and/or the referral module 208.

The electronic wallet module 210 may store payment information and transaction information which may be provided at least in part to the service provider 102. For example, the service provider 102 may enable the customer 106 to store electronic money in the electronic wallet module 210. The customer 106 may then spend the electronic money using the electronic wallet module 210 when transacting with the merchant 108. Transaction data obtained by the electronic wallet module 210 may include information about the merchant 108, the item purchased, and/or other information, which may then be accessible at least partially to the service provider 102. For example, the service provider 102 may be able to aggregate purchase information obtained from use of multiple customers' electronic wallet modules, which in turn may provide a history of prices for items and at least some inventory information.

The customer device 112 may also include a locating device 212, a transceiver 214 to communicate with the service provider 102 via the network(s) 110, and/or an imaging device 216. The locating device 214 may be a global positioning system (GPS) receiver or other hardware that can be used to provide location information. For example, location information may be obtained by analyzing the customer device's activity or identification of the network(s) 110, or by other techniques known in the art. The imaging device 216 may be a camera, a scanner, or another optical device capable of capturing imagery of an item, a location, of text, and/or of other types of information.

FIG. 2B shows illustrative computing architecture of the servers 218 associated with the service providers 102. The servers 218 may be implemented in a distributed configuration (e.g., cloud computing services, etc.) or non-distributed configuration (e.g., local servers, etc.). The architecture may include processor(s) 220 and computer-readable media 222. The computer-readable media 222 may store various modules, applications, programs, or other data. The computer-readable media 222 may include instructions that, when executed by the processor(s) 220, cause the processor (s) to perform the operations described herein for the servers 218. In some embodiments, the computer-readable media 220 may store a marketplace seller application 224 and/or a payment processor application 226. The marketplace seller application 224 may further store one or more of a referral acquisition module 228, a filter module 230, a recruiting module 232, and/or a reward module 234. Each application and module is discussed in turn.

The referral acquisition module 228 may receive information about sellers from the lookup module 206 and/or the referral module 208. For example, the referral acquisition module 228 may receive basic information about a merchant, such as the merchant 108, from the lookup module 206. The referral acquisition module 228 may then request additional information about the merchant, which may be received by the referral acquisition module 228 from the referral module 208. Thus, the referral acquisition module 228 may received the device data 116 and/or the merchant/item information 118 from the customer device 112.

The filter module 230 may analyze and/or filter the information obtained by the referral acquisition module 228 to identify merchants to be recruited to join the electronic marketplace 104. In some embodiments, the filter module 230 may cause the referral acquisition module 228 to request additional information about a merchant. The filter module may access existing seller data 236 and/or existing item data 238 to determine whether the merchant is an existing seller on the electronic marketplace 104 and/or whether the item is an existing item on the electronic marketplace 104. When the merchant is an existing seller on the electronic marketplace 104 and the item is an existing item on the electronic marketplace 104, the filter module 230 may terminate a recruiting process. However, when the merchant is not an existing seller on the electronic marketplace 104 and/or the item is not an existing item on the electronic marketplace 104, as determined by reference to the existing seller data 236 and/or the existing item data 238, respectively, then the filter module 230 may proceed with the recruiting process that utilizes the recruiting module 232.

The recruiting module 232 may perform operations to recruit the merchant to join the electronic marketplace and offer items for sale to customers. The recruiting module 232 may perform an at least partially automated process to transmit the invitation 124 to the merchant 108 and possibly process the response 126 when the response is received from the merchant 108. In some embodiments, the recruiting module 232 may interact with a user that may assist in determining details and agreement terms associated with the merchant 108 operating as part of the electronic marketplace 104.

The reward module 234 may determine a reward to provide to the customer 106 in response to a referral satisfying criteria required to receive the reward. For example, the reward module 234 may determine whether the merchant 108 has performed a required task using the electronic marketplace prior to providing the reward to the customer 106. The reward module 234 may deploy fraud detection logic to thwart fraudulent attempts to gain rewards by scheming customers.

The payment processor application 226 may process payments for the merchant 108 or otherwise have accesses to transaction data 120 from a merchant device 122 of the merchant 108. In some embodiments, the payment processor application may be a POS application that at least partially processes transactions for the merchant 108. The payment processor application 226 may receive the transaction data 120 from the merchant device 122, which may be stored as historical transaction data 240. The payment processor application 226 may query or otherwise analyze the historical transaction data 240 to determine whether or not to recruit the merchant as a seller using the recruiting module 232.

Illustrative Operations

Figure 3:
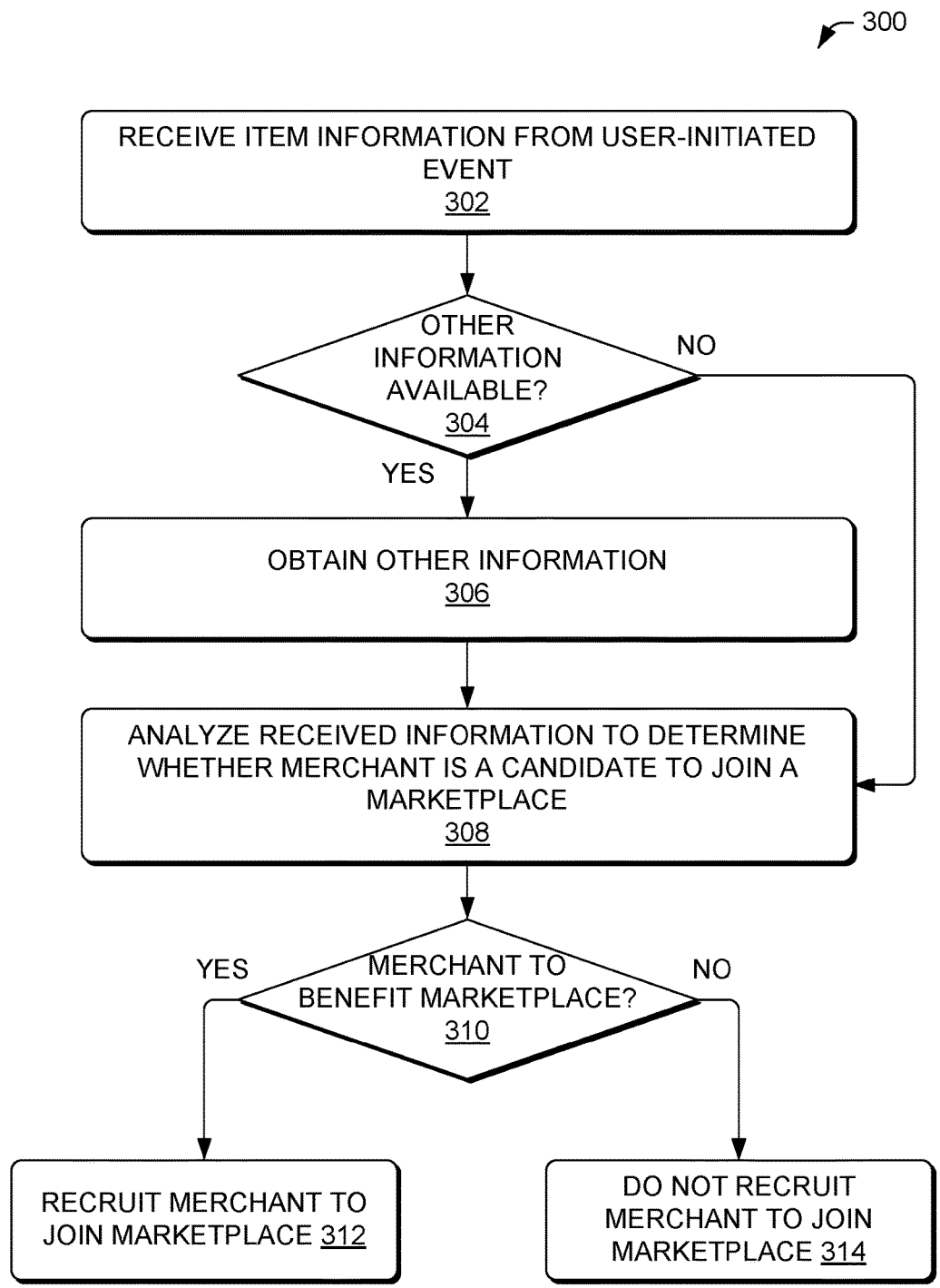
FIG. 3 is a flow diagram of an illustrative process to identify a seller that may join an electronic marketplace.
Figure 4:
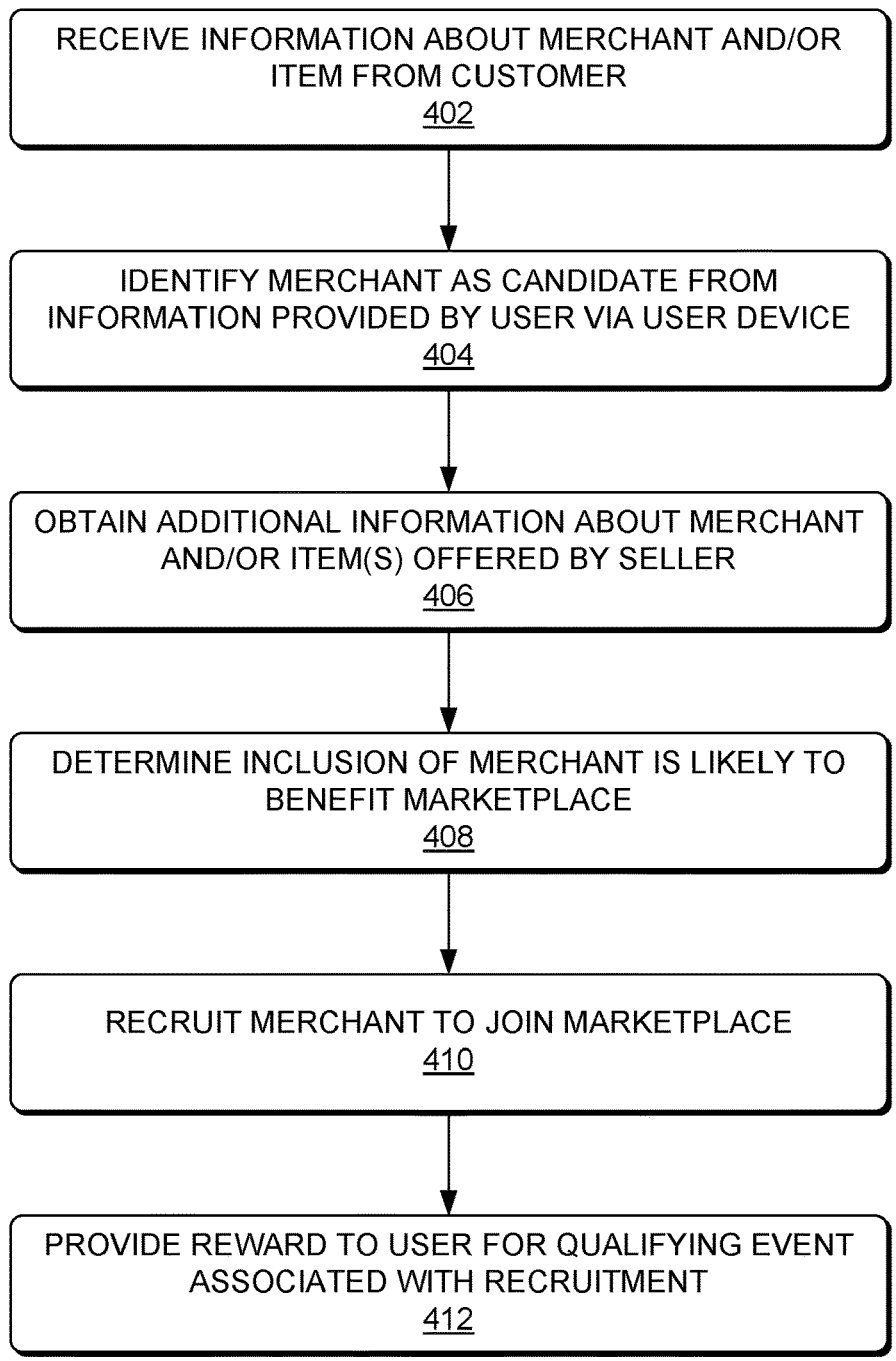
FIG. 4 is a flow diagram of an illustrative process to identify a seller to recruit to join an electronic marketplace by collecting information from a customer about the seller.
Figure 5:
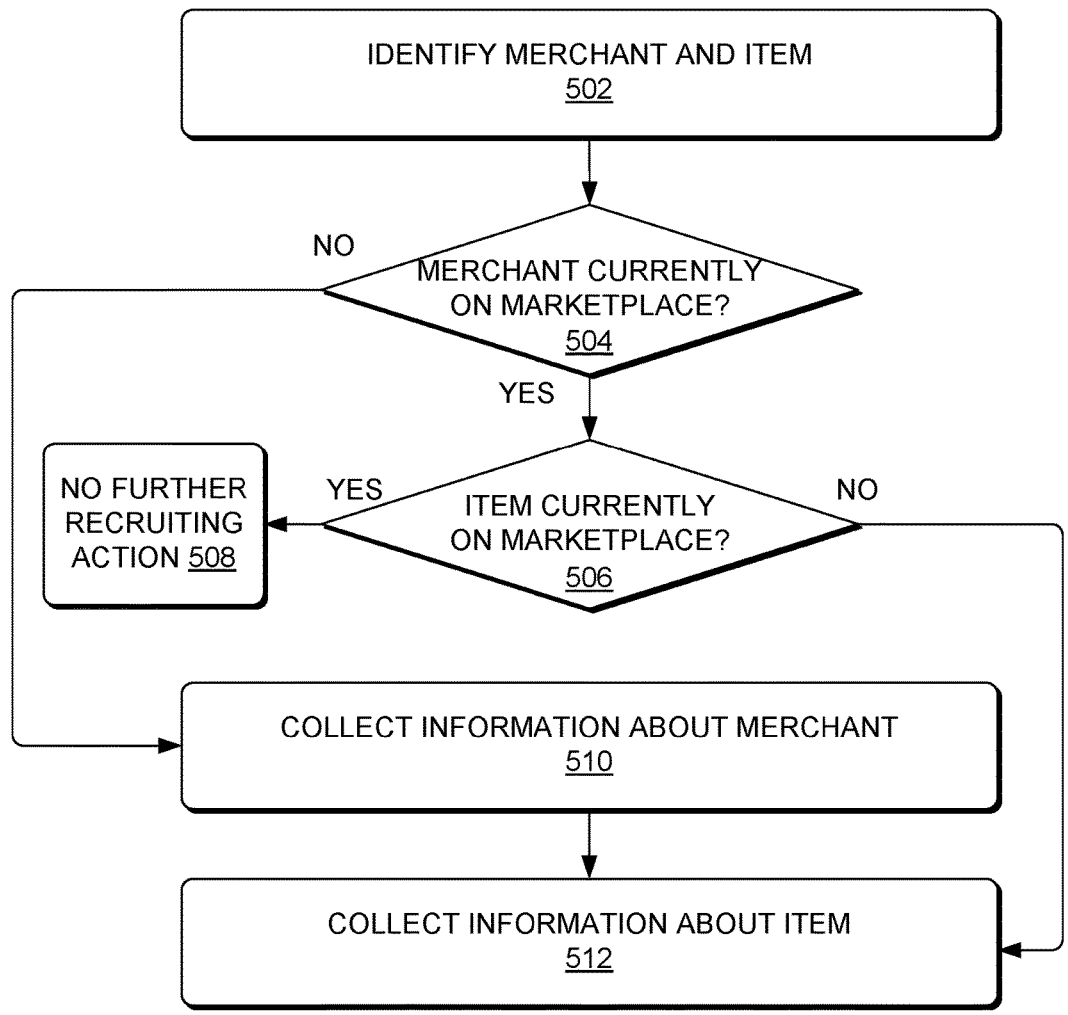
FIG. 5 is a flow diagram of an illustrative process to determine whether a seller has a presence on an electronic marketplace and/or is selling a particular item on the electronic marketplace.

FIGS. 3-5 show various processes to facilitate a referral service to identify new sellers for an electronic marketplace. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to identify a seller that may join an electronic marketplace. The process 300 may be performed by the servers 218 for the service provider 102. The process 300 may be implemented using the environment 100; however, other the process 300 may also be implemented in other environments.

At 302, the service provider 102 may receive item information from a user initiated event. In some embodiments, the item information may be received in response to use of the lookup module 206, which may communicate with the referral acquisition module 228 to provide the item information to the service provider 102. In various embodiments, the item information may be received in response to use of the electronic wallet module 210, which may communicate with the referral acquisition module 228 to provide the item information to the service provider 102. In accordance with one or more embodiments, the payment processor application 226 may receive the item information from the merchant 108 when the payment processor application 226 processes a payment for the merchant 108 where the payment includes the item information. In one or more embodiments, the item information may be received by a kiosk or other type of direct input that provides information directly to the service provider 102. For example, the service provider 102 may have physical locations (e.g., stores, support centers, etc.) and, within one or more of those physical locations, may provide a mechanism to gather information from the user-initiated events.

At 304, the service provider 102 may determine whether additional information is available about the item and/or about the seller of the item. The additional information may include, without limitation, price information, price duration information, inventory information, delivery options, installation options, bonuses or other promotions associated with the item, special versions of the item, and/or other attributes of the item. The additional information may include information about the seller, such as a location of the seller, whether the seller provides access to the items electronically using any available electronic market (possibly including the electronic market 104), a contact at the seller (e.g., the store operator 114 or another human), and other attributes of the seller. The location of the seller or other information may be extracted from various sources, such as from a check in at a social networking site used by the customer 106.

When other information is available (following the "yes" route from the decision operation 304), then the other information may be obtained at an operation 306. The other information may be obtained by querying data (e.g., the existing seller data 236, the existing item data 238, the historical transaction data 240, and/or transmitting a request for the other information from the customer 106 via the referral module 208 of the customer device 112, from the merchant 108, and/or from other sources (e.g., the Internet, listing services, etc.). In response to the request, the referral acquisition module 228 may receive at least some of the additional information about the merchant 108 from the customer device 112 of the customer 106 and/or from other sources.

When other information is not available (following the "no" route from the decision operation 304), or when the other information is obtained at 306 (following the operation 306), the process 300 may advance to an operation 308. At 308, the service provider 102 may analyze the received information to determine whether the merchant 108 is a candidate to join the electronic marketplace 104. The filter module 230 may perform the analysis based on various factors which may include, without limitation, the existing seller data 236, the existing item data 238, the price of the item, conditions of the price (e.g., sale price, regular price, coupon price, etc.), the inventory or approximate inventory of the item, and/or other information about the item or the merchant 108.

At 310, the service provider 102 may determine whether the addition of the merchant as a seller in the electronic marketplace is likely to benefit the electronic marketplace. The filter module 230 may make the determination at the operation 310 based on the analysis performed at the operation 308.

When the service provider 102 determines that the merchant 108 is likely to benefit the electronic marketplace (following the "yes" route from the decision operation 310), then the process 300 may advance to an operation 312. At 312, the service provider 102 may attempt to recruit the merchant 108 to join the electronic marketplace 104 and offer item for consumption by other customers via the electronic marketplace 104. For example, the recruitment module 232 may be deployed to communicate with the merchant 108 to solicit an invitation to the merchant 108.

When the service provider 102 determines that the merchant 108 is not likely to benefit the electronic marketplace (following the "no" route from the decision operation 310), then the process 300 may advance to an operation 314, which may terminate recruitment efforts by the service provider 102.

FIG. 4 is a flow diagram of an illustrative process 400 to identify a seller to recruit to join an electronic marketplace by collecting information from a customer about the seller. The process 400 may be performed by the servers 218 for the service provider 102, which may interact with and collect information from the customer device 112. The process 400 may be implemented using the environment 100; however, other the process 400 may also be implemented in other environments.

At 402, the service provider 102 may receive information about an item or the merchant 108 from the customer 106. For example, the referral acquisition module 228 may receive information from the customer 106 that interacts with the lookup module 206. The customer 106 may transmit information to the referral acquisition module 228 via the lookup module 208 by entering data (e.g., typing data, etc.), by scanning an item, by taking a photograph of an item, by reading an RFID tag using the customer device 112, and/or by other techniques to capture data via the customer device 112, which may then be transmitted to the service provider 102 via the referral acquisition module 228.

At 404, the service provider 102 may use the filter module 230 to identify that the merchant 108 is a candidate to join the electronic marketplace based on an analysis of the information received at the operation 402. For example, the information received at the operation 402 may indicate that the merchant 108 may provide a benefit to the electronic marketplace 104 by offering new or different items than existing items offered by sellers on the electronic marketplace 104, by offering one or more items at a lower price than an average or going price for similar items offered by sellers on the electronic marketplace 104, and/or by otherwise providing a benefit to the electronic marketplace 104.

At 406, the service provider 102 may obtain additional information about the merchant 108 and/or the one or more items offered by the merchant. For example, the referral acquisition module 228 may request additional information from the customer 106 via the referral module 208 via the customer device 112, may query data such as the existing seller data 236 and/or the existing item data 238, and/or search for information about the merchant 108 and/or the one or more items from other sources (e.g., other customer interactions with the merchant 108, online, etc.).

At 408, the service provider 102 may use the filter module 230 to analyze the information from the operation 402 and the additional information from the operation 406, when available, to determine that inclusion of the merchant is likely to benefit the electronic marketplace 104. The filter module 230 may analyze any number of factors to determine the likelihood that inclusion of the merchant with the electronic marketplace 104 is likely to benefit the electronic marketplace. Factors may include price, inventory, installation options, delivery options, uniqueness of the item, special promotions by the merchant, a need by the electronic marketplace 104 (e.g., to fill a missing item offering, etc.) and/or other factors.

At 410, the service provider 102, using the recruiting module 233, may recruit the merchant 108 to join the electronic marketplace. The recruiting may be performed using the information collected at the operation 402 and/or the additional information collected at the operation 406. For example, the recruiting may use contact information provided about the merchant 108 to contact the merchant and inform the merchant of benefits of joining the electronic marketplace. The recruiting process may be an automated or partially automated process.

At 412, the service provider 102 may provide a reward to the customer 106 in response the recruiting of the merchant 108 to the electronic marketplace. For example, the reward module 234 may provide a reward to the customer 106 in response to recruiting the merchant 108 to join the electronic marketplace 104. The reward may be contingent on activity by the merchant 108 as a seller on the electronic marketplace 104. For example the customer 106 may receive a reward, such as a gift card, a rebate, a payment, or another reward after the merchant 108 becomes active as a seller on the electronic marketplace 104. In some embodiments, the service provider may employ fraud detection to prevent misuse of the referral system. The fraud detection may limit the amount of referrals by the customer 106, select the customer as a designated person to submit referrals (e.g., a qualified person, etc.), and/or perform other fraud detection to ensure that the reward is obtained in compliance with recruitment rules implemented by the service provider 102 and/or the electronic marketplace 104.

FIG. 5 is a flow diagram of an illustrative process 500 to determine whether a seller has a presence on an electronic marketplace and is selling a particular item on the electronic marketplace. The process 500 may be performed by the servers 218 for the service provider 102. The process 500 may be implemented using the environment 100; however, other the process 500 may also be implemented in other environments. The process 500 may be implemented, at least partly, with the process 300 (e.g., via the operation 306) and/or the process 400 (via the operations 404 and 406).

At 502, the service provider 102 may identify the merchant 108 and item from data received from the customer 106 via the customer device 112 or from the merchant 108 via the transaction data 120. For example, the filter module 230 may perform a query to determine whether the existing seller data 236 or the existing item data 238 includes the merchant 108 and/or the item identified.

At 504, the service provider 102 may determine whether the merchant 108 identified at the operation 502 is currently offering items on the electronic marketplace 104. For example, the filter module 230 may query the existing seller data 236 to determine whether the merchant 108 is listed among active sellers that offer items on the electronic marketplace 104. When the merchant 108 is currently offering items on the electronic marketplace (following the "yes" route from the decision operation 504), then the process 500 may advance to a decision operation 506.

At 506, the service provider 102 may determine whether the item identified at the operation 502 is currently available on the electronic marketplace 104. For example, the filter module 230 may query the existing item data 238 to determine whether the item is listed and available for consumption on electronic marketplace 104. When the item is currently available on the electronic marketplace 104 (following the "yes" route from the decision operation 506), then the process 500 may advance to an operation 508.

At 508, the service provider 102 may terminate an inquiry and/or recruiting process about the merchant 108 because the process 500 determined that the merchant already offers the item on the electronic marketplace 104. In some embodiments, the service provider 108 may provide additional information to the customer 106 via the customer device 112 at the operation 508, such as information about the item or similar items that are available from other merchants via the electronic marketplace 104. In some instances, the service provider 102 may share a commission with the merchant 108 when the customer 106 makes a purchase from the electronic marketplace 104 rather than from the merchant 108 in response to offers provided by the service provider 102.

However, when the merchant 108 is not currently offering items on the electronic marketplace 104 (following the "no" route from the decision operation 504), then the process 500 may advance to an operation 510. At 510, the referral acquisition module 228 may determine to collect additional information about the merchant 108 since the merchant may be a potential candidate to join the electronic marketplace 104.

At 512, following the operation 510 or when item is not currently available on the electronic marketplace 104 (following the "no" route from the decision operation 506), the referral acquisition module 228 may determine to collect additional information about the item since the item may be a potential candidate for an offering on the electronic marketplace 104. In some embodiments, the referral acquisition module 228 may also determine to request collection of information about other items, such as similar items that may be offered by the merchant 108, items in a same category, items not currently offered by the electronic marketplace but associated with the item offered by the merchant, and so forth.

Illustrative User Interfaces

FIG. 6 is an illustrative user interface (UI) 600 that facilitates obtaining information about a customer experience at a seller that may lead to a referral of the seller to an electronic marketplace. The UI 600 includes possible information that may be collected by the customer device 112 running the lookup module 206 and/or the referral module 208. Once collected, the information may be transmitted to the service provider 102 for receipt by the referral acquisition module 228. The UI 600 may include an item information section 602, a price information section 604, and/or a merchant information section 606. Each section is discussed in turn.

The item information section 602 may collect information about an item. The item information may be obtained by using a camera, scanner, or other imaging device using an item control 608. For example, the customer 106 may select the item control 608, which may allow the customer 106 to photograph the item, packaging for the item, a bar code, a quick response (QR) code, a price tag, a merchant product tag, or other visual feature associated with the item. The collected information (e.g., image, etc.), may be transmitted by the lookup module 206 to the referral acquisition module 228 for further analysis. For example, the referral acquisition module 228 may identify the item from the image or other information. In some embodiments, the item control 608 may obtain the information using non-optical techniques, such as by reading an RFID tag or acquiring information through other non-optical techniques. The item information section 602 may also include an item text field 610 that allows user entry of the item or information that identifies the item (e.g., Universal Product Code (UPC) or other code, item name, etc.).

The price information section 604 may collect information about a price of the item. The price information may be obtained by using a camera or other imaging device using a price control 612. For example, the customer 106 may select the price control 612, which may allow the customer 106 to photograph a price tag, packaging for the item, an advertisement, a merchant product tag, or other visual feature associated with the price of the item. The collected information (e.g., image, etc.), may be transmitted by the lookup module 206 to the referral acquisition module 228 for further analysis. For example, the referral acquisition module 228 may identify the price from the image or other information. In some embodiments, the price information may be determined based on an analysis of the image captured via the item control 608. The price information section 604 may also include a price field 614 that allows user entry of the price for the item. In addition, the price information section 604 may also include a price conditions field 616 that allows capture of the conditions for the item. Examples of possible conditions include "on sale," "with coupon," "limited quantity," "none, regular price" etc.

The merchant information section 606 may collect information about a merchant. The merchant information may include a location of the user when the user is present in a physical location of the merchant, thus a merchant location. An location control 618 may initiate capture and transmission of the location information using global positioning system (GPS) location data, wireless location information (e.g., internet protocol (IP) address information, network name, etc.) that can be used to extract location information. The collected information (e.g., image, etc.), may be transmitted by the lookup module 206 to the referral acquisition module 228 for further analysis. In some embodiments, the location or merchant information may be determined based on an analysis of the image captured via the item control 608. The merchant information section 606 may also include a seller name field 620 that allows user entry of the merchant name and/or location.

The UI 600 may include a next control 622 that may initiate processing of data captured using the UI 600. The UI 600 may also include other controls, such as a home control 624 that allows navigation to a home page or other pages.

In accordance with various embodiments, the UI 600 may collect information for use by the lookup module 206. The lookup module 206 and/or the referral module 208 may not require each of the fields and/or controls in the UI 600 to be available, used, and/or populated by the customer 106 in order to perform the operations discussed herein.

FIG. 7 is an illustrative UI 700 that facilitates collecting information about the seller and/or item information that may lead to a referral of the seller to an electronic marketplace. The UI 700 includes possible additional information that may be collected by the customer device 112 running the lookup module 206. Once collected, the additional information may be transmitted to the service provider 102 for receipt by the referral acquisition module 228. The UI 700 may be presented following submission of data using the UI 600 and following an analysis such as the analysis described in the process 500. The UI 700 may include a merchant information section 702 and an item information section 704. Each section is discussed in turn.

The merchant information section 702 may include a name field 706 to capture a name of store operator 114 or other person that may be contacted during a recruiting effort by the service provider 102 via the recruiting module 232. The merchant information section 702 may also include an electronic mail field 708 and/or a telephone number field 710 that provide information to allow the service provider 102 to contact the store operator 114 or other person.

The item information section 704 may include a price field 712 and a price conditions field 714. The price field 712 may correspond to the price field 614 and may be populated with the information in the price field 614 when information is available (e.g., captured by the UI 600, etc.). Similarly, the price conditions field 714 may correspond to the price conditions field 616. A quantity field 716 may be used to capture an approximate quantity of items available. In some instances, ranges of products may be input such as 50-75 items, etc., which may be input manually or by selection from listed options.

The item information section 704 may also include options to identify information about attributes of the item. The information may be collected by a unique version control 718 that indicates that the item is unique (e.g., not generally available from other merchants, etc.), collected by an expedited delivery control 720 that indicates that expedited delivery is available, and/or collected by an installation control 722 that indicates that installation is available. The item information section 704 may also include a bonus control 724 that indicates that the item includes a bonus, which may be described by a description field 726. A comment field 728 may capture additional information about the item.

The UI 700 may include a submit control 730 that may initiate processing of data captured using the UI 700. The UI 700 may also include other controls, such as a home control 732 that allows navigation to a home page or other pages.

In accordance with various embodiments, the UI 700 may collect information for use by the lookup module 206 and/or the referral module 208. The lookup module 206 and/or the referral module 208 may not require each of the fields in the UI 700 to be available and/or populated by the customer 106 in order to perform the operations discussed herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
receiving, at a server via a network and from an electronic device of a customer of a merchant, an image of a bar code associated with an item offered by the merchant at a physical location of the merchant, the image of the bar code having been captured by a camera of the electronic device of the customer while the electronic device of the customer was located at the physical location of the merchant;
determining, based at least in part on an analysis of the image of the bar code, an identification of the item;
receiving, at the server via the network and from the electronic device of the customer, an image of a price tag associated with the item, the image of the price tag having been captured by the camera of the electronic device of the customer while the electronic device of the customer was located at the physical location of the merchant;
determining, based at least in part on an analysis of the image of the price tag, a price of the item;
analyzing, by executing instructions at the server, the price of the item by comparing the price of the item to an average price of the item offered by other merchants on an electronic marketplace;
determining, based at least in part on the analyzing, that the price of the item is less than the average price of the item offered by the other merchants;
determining, by executing the instructions at the server and based at least in part on the price of the item being less than the average price of the item offered by the other merchants, to recruit the merchant to offer the item for consumption on the electronic marketplace that offers items for consumption from various other merchants;
creating, by executing the instructions at the server, an invitation for the merchant to invite the merchant to join the electronic marketplace to offer the item for consumption based at least in part on the determining to recruit the merchant; and
transmitting, by the server via the network, the invitation to the merchant using contact information of the merchant.

2. The method as recited in claim 1, wherein the determining to recruit the merchant and the creating of the invitation is performed using an automated process.

3. The method as recited in claim 1, further comprising determining, from data accessible to the server, an approximate inventory of the item at the physical location of the merchant, wherein the determining to recruit the merchant is further based on the approximate inventory of the item.

4. The method as recited in claim 1, further comprising:
receiving a response from the merchant accepting the invitation in response to the transmitting of the invitation; and
adding the merchant and the item to the electronic marketplace in response to the receiving the response accepting the invitation for the merchant to join the electronic marketplace and offer the item for consumption.

5. A method comprising:
receiving, by one or more servers via a network and from an electronic device of a customer of a merchant, an image of a first visual feature associated with an item that is located at a physical location of the merchant, the image of the first visual feature having been captured by a camera of the electronic device of the customer while the electronic device of the customer was located at the physical location of the merchant;
determining, based at least in part on an analysis of the image of the first visual feature, an identification of the item;
receiving, by the one or more servers via the network and from the electronic device of the customer, an image of a second visual feature associated with the item, the image of the second visual feature having been captured by the camera of the electronic device of the customer while the electronic device of the customer was located at the physical location of the merchant;
determining, based at least in part on an analysis of the image of the second visual feature, a price of the item;
analyzing, by executing instructions at the one or more servers, the price of the item as compared to an average price of the item offered by other merchants on an electronic marketplace;
determining, by executing the instructions at the one or more servers and based at least in part on a result from the analyzing of the price of the item, to recruit the merchant to offer the item for consumption on the electronic marketplace that offers items for consumption; and transmitting, by the one or more servers via the network, an invitation to the merchant using contact information of the merchant, the invitation to invite the merchant to join the electronic marketplace to offer the item for consumption based at least in part on the determining to recruit the merchant.

6. The method as recited in claim 5, further comprising:
prior to the determining to recruit the merchant:
requesting, by the one or more servers, based at least in part the identification of the item, additional information about the item, the merchant, or both; and
receiving the additional information,
wherein the determining to recruit the merchant is based at least in part on the additional information.

7. The method as recited in claim 5, wherein:
the determining to recruit the merchant is further based at least in part on the identification of the item and an availability of the item on the electronic marketplace.

8. The method as recited in claim 5, further comprising creating the invitation using an automated process.

9. The method as recited in claim 5, further comprising determining that the merchant does not offer the item for sale on the electronic marketplace prior to the determining to recruit the merchant.

10. One or more non-transitory computer-readable storage media storing computer-executable instructions that, when executed on one or more processors, cause the one or more processors to:
receive, via a network and from an electronic device of a customer of a merchant, an image of a first visual feature associated with an item that is located at a physical location of the merchant, the image of the first visual feature having been captured by a camera of the electronic device of the customer while the electronic device of the customer was located at the physical location of the merchant;
determine, based at least in part on an analysis of the image of the first visual feature, an identification of the item;
receive, via the network and from the electronic device of the customer, an image of a second visual feature associated with the item, the image of the second visual feature having been captured by the camera of the electronic device of the customer while the electronic device of the customer was located at the physical location of the merchant;
determine, based at least in part on an analysis of the image of the second visual feature, a price of the item;
analyze the price for the item as compared to an average price of the item offered by other merchants on an electronic marketplace;
determine, based at least in part on the identification of the item and a result from analyzing the price of the item, to recruit the merchant to join the electronic marketplace to offer the item for consumption; and
transmit, via the network and using contact information of the merchant, an invitation to the merchant to invite the merchant to join the electronic marketplace.

11. The one or more non-transitory computer-readable storage media as recited in claim 10, wherein the instructions cause the one or more processors to:
store the image of the first visual feature and the image of the second visual feature as stored image data; and
query the stored image data to determine the identification of the item and the price for the item.

12. The one or more non-transitory computer-readable storage media as recited in claim 10, wherein the instructions cause the one or more processors to, in response to determining the identification of the item and the price for the item, transmit at least one price for the item that is available on the electronic marketplace and a selector that allows access to the item on the electronic marketplace.

13. The one or more non-transitory computer-readable storage media as recited in claim 10, wherein the instructions cause the one or more processors to create the invitation using an automated process in response to determining to recruit the merchant.

14. The one or more non-transitory computer-readable storage media as recited in claim 10, wherein the instructions cause the one or more processors to request additional information about the merchant or the item prior to determining to recruit the merchant.

15. The one or more non-transitory computer-readable storage media as recited in claim 10, wherein the instructions cause the one or more processors to determine, based at least in part on aggregated purchase information received from multiple electronic wallets of customers that transacted with the merchant, an approximate inventory of the item at the physical location of the merchant, wherein the determining to recruit the merchant is further based on the approximate inventory of the item.

16. The method as recited in claim 5, further comprising determining, based at least in part on aggregated purchase information received from multiple electronic wallets of customers that transacted with the merchant, an approximate inventory of the item at the physical location of the merchant, wherein the determining to recruit the merchant is further based on the approximate inventory of the item.

17. The method as recited in claim 5, further comprising receiving, by the one or more servers via the network and from the electronic device of the customer, the contact information of the merchant.

18. The method as recited in claim 5, wherein the first visual feature includes a bar code associated with the item, and wherein the second visual feature includes a price tag associated with the item.

19. The method as recited in claim 5, wherein the result from the analyzing of the price of the item indicates that the price of the item is less than the average price of the item offered by the other merchants.

20. The one or more non-transitory computer-readable storage media as recited in claim 10, wherein the first visual feature includes a bar code associated with the item, and wherein the second visual feature includes a price tag associated with the item.

21. The one or more non-transitory computer-readable storage media as recited in claim 10, wherein the result from the analyzing of the price of the item indicates that the price of the item is less than the average price of the item offered by the other merchants.

* * * * *